(12) United States Patent
Alexanian et al.

(10) Patent No.: US 12,238,094 B2
(45) Date of Patent: *Feb. 25, 2025

(54) AUTHENTICATION AS A SERVICE

(71) Applicant: Wells Fargo Bank, N.A., San Francisco, CA (US)

(72) Inventors: Mariam Alexanian, San Francisco, CA (US); Andrew G. Foote, San Francisco, CA (US); Ilya Ozerets, San Francisco, CA (US); Shanti Tandukar, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,888

(22) Filed: Sep. 26, 2023

(65) Prior Publication Data

US 2024/0015151 A1    Jan. 11, 2024

Related U.S. Application Data

(63) Continuation of application No. 17/685,880, filed on Mar. 3, 2022, now Pat. No. 11,811,757, which is a
(Continued)

(51) Int. Cl.
*G06F 21/00* (2013.01)
*G06F 18/22* (2023.01)
(Continued)

(52) U.S. Cl.
CPC .......... *H04L 63/0861* (2013.01); *G06F 18/22* (2023.01); *G06F 21/32* (2013.01); *G06F 21/45* (2013.01); *G06V 40/50* (2022.01)

(58) Field of Classification Search
CPC ..... H04L 63/0861; G06F 18/22; G06F 21/32; G06F 21/45; G06V 40/50
See application file for complete search history.

(56) References Cited

U.S. PATENT DOCUMENTS

| 7,086,085 | B1 | 8/2006 | Brown et al. |
| 2003/0163710 | A1* | 8/2003 | Ortiz ................... H04L 63/0861 713/186 |

(Continued)

*Primary Examiner* — Michael M Lee
(74) *Attorney, Agent, or Firm* — Foley & Lardner LLP

(57) ABSTRACT

An illustrative method for authenticating a user is disclosed. A security threshold is received from a third party. Environmental conditions associated with a device are assessed to determine a suitable subset of a plurality of biometric authentication modalities for authenticating the user and an unsuitable subset not available for authenticating the user. The plurality of biometric authentication modalities are displayed, where the suitable subset is selectable by the user and the unsuitable subset are not selectable by the user. A selection of a biometric authentication modality from the suitable subset is received, and user authentication data for the selected biometric authentication modality is received. The user authentication data is compared with previously-determined biometric data, an authentication score is determined based on the comparison, the authentication core is compared to a security threshold, and the user is authenticated in response to determining the authentication score satisfies the security threshold.

20 Claims, 9 Drawing Sheets

Related U.S. Application Data continuation of application No. 16/022,427, filed on Jun. 28, 2018, now Pat. No. 11,303,631.

(60) Provisional application No. 62/527,877, filed on Jun. 30, 2017.

(51) Int. Cl.
*G06F 21/32* (2013.01)
*G06F 21/45* (2013.01)
*G06V 40/50* (2022.01)
*H04L 9/40* (2022.01)

(56) References Cited

U.S. PATENT DOCUMENTS

| | | | |
|---|---|---|---|
| 2009/0133106 A1* | 5/2009 | Bentley | G06F 21/32 726/5 |
| 2011/0231911 A1 | 9/2011 | White et al. | |
| 2013/0267204 A1 | 10/2013 | Schultz et al. | |
| 2014/0289820 A1 | 9/2014 | Lindemann et al. | |
| 2015/0227937 A1 | 8/2015 | Giles | |
| 2015/0358316 A1 | 12/2015 | Cronin | |
| 2015/0381602 A1* | 12/2015 | Grim | H04W 12/30 726/4 |
| 2016/0055326 A1 | 2/2016 | Votaw et al. | |
| 2016/0149906 A1 | 5/2016 | Yamada | |
| 2016/0191511 A1 | 6/2016 | Tijerina et al. | |
| 2016/0241555 A1 | 8/2016 | Vo et al. | |
| 2016/0359838 A1 | 12/2016 | Dasgupta et al. | |
| 2017/0048230 A1 | 2/2017 | Johansson et al. | |
| 2017/0200042 A1* | 7/2017 | Nada | G06T 3/60 |
| 2018/0034859 A1 | 2/2018 | Aronowitz et al. | |
| 2018/0041503 A1 | 2/2018 | Lindemann | |
| 2018/0197624 A1* | 7/2018 | Robaina | G06F 16/2379 |
| 2018/0309792 A1* | 10/2018 | Obaidi | G06F 21/32 |
| 2018/0351925 A1 | 12/2018 | Badri et al. | |
| 2019/0220583 A1 | 7/2019 | Douglas et al. | |

\* cited by examiner

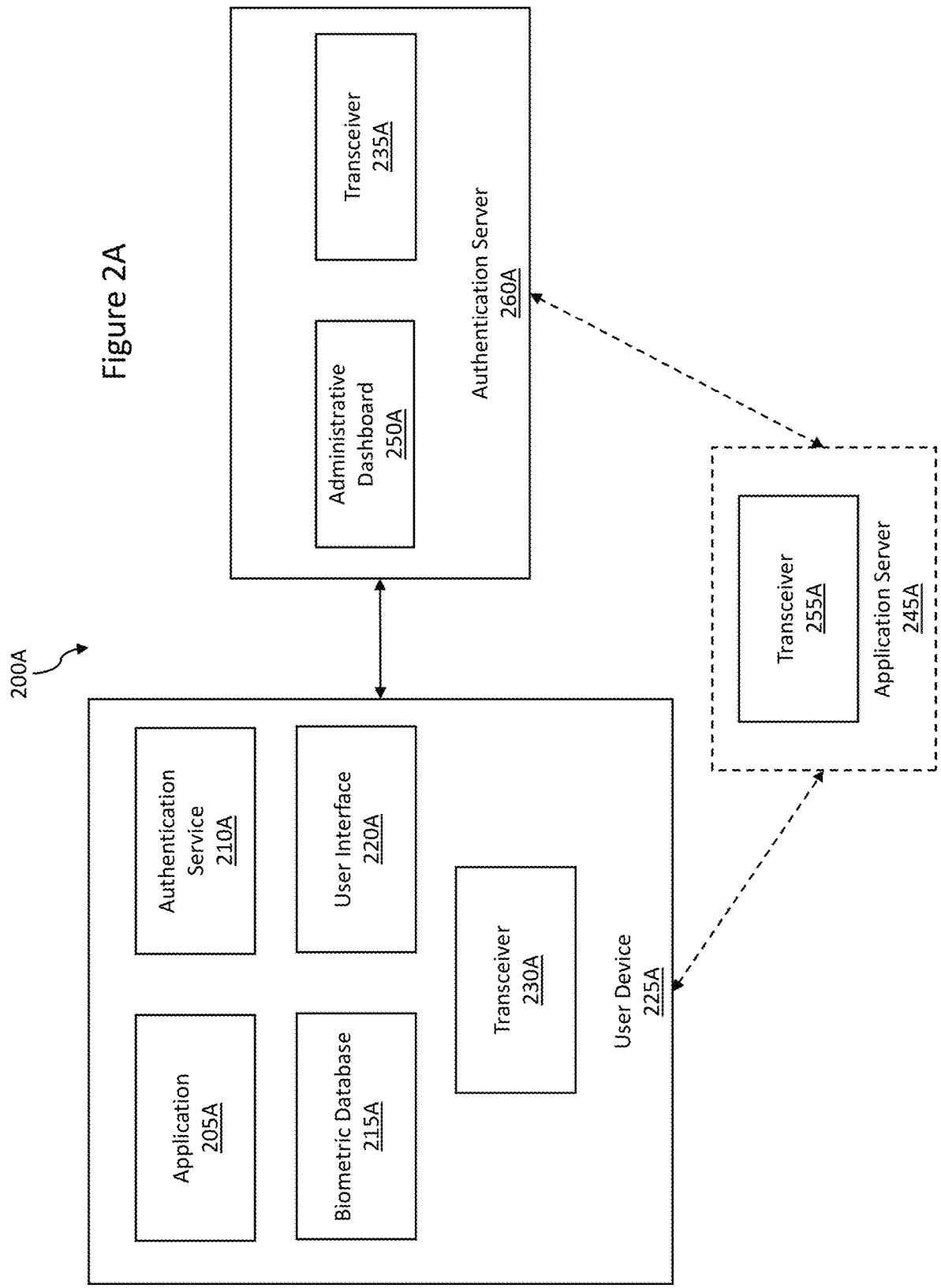

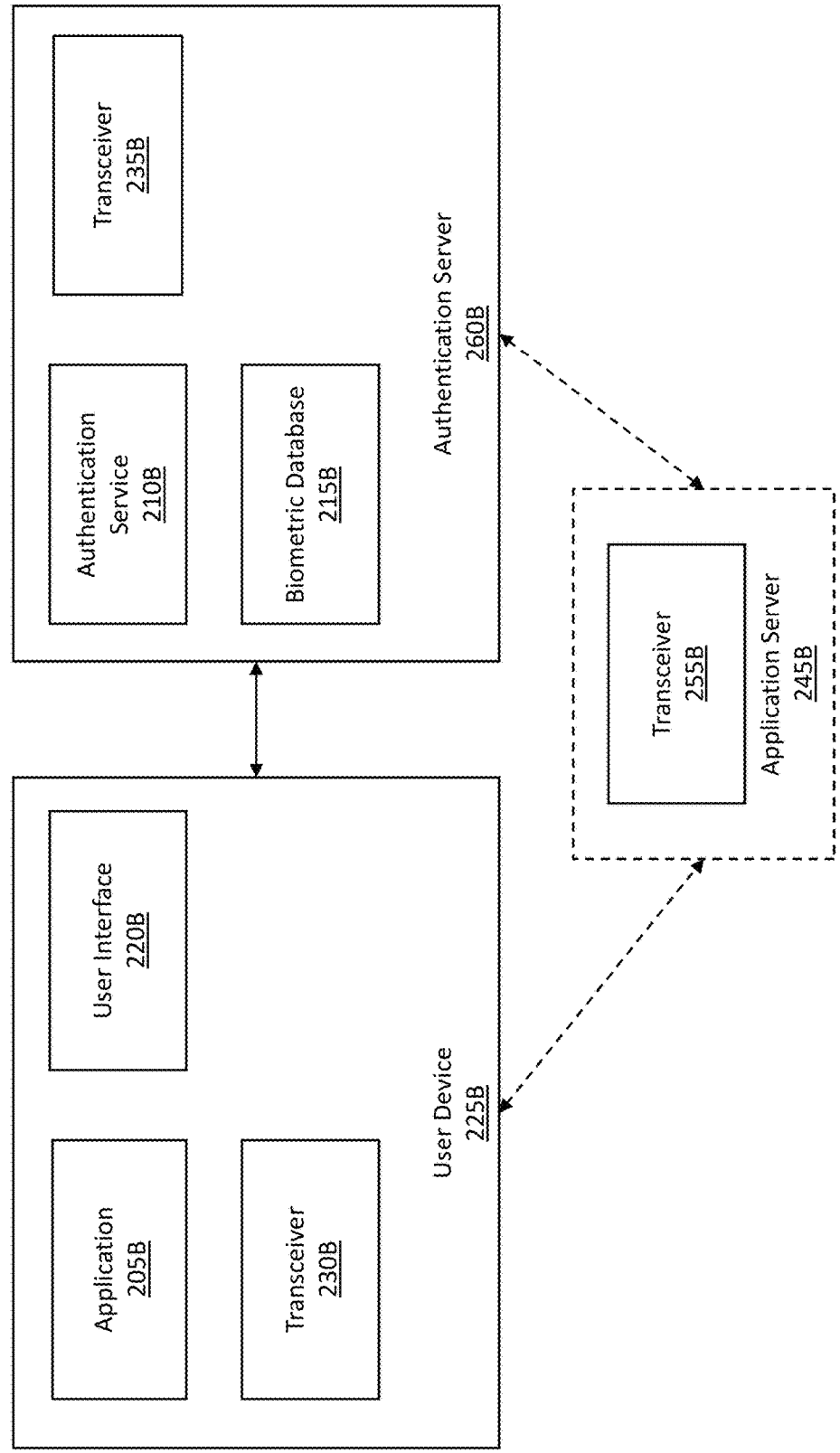

AUTHENTICATION AS A SERVICE

CROSS REFERENCE TO RELATED APPLICATION

This application is a continuation of U.S. patent application Ser. No. 17/685,880, entitled "Authentication as a Service," filed on Mar. 3, 2022, which is a continuation of U.S. patent application Ser. No. 16/022,427, entitled "Authentication as a Service," filed on Jun. 28, 2018, which claims priority to U.S. Provisional Patent Application No. 62/527,877, entitled "Authentication as a Service," filed on Jun. 30, 2017, which are hereby incorporated by reference in their entireties.

BACKGROUND

Users of services provided by computing networks often have to remember or somehow keep track of multiple passwords used for authentication of the users upon accessing such services. To make it easier on themselves, many users have simple passwords or use the same password for each of the multiple services, thereby decreasing the security afforded by the passwords as compared to using complex, unique passwords for each service.

SUMMARY

In accordance with at least some aspects of the present disclosure, an illustrative method for authenticating a user is disclosed. A plurality of biometric modalities are displayed for authenticating the user. A selection of one or more of the biometric authentication modalities. User authentication data is received for each of the one or more selected authentication modalities. The user authentication data is compared with previously-determined biometric data. An authentication score is determined based on the comparison of the user authentication data with the previously-determined biometric data. A determine is made whether to authenticate the user based on the authentication score.

In accordance with at least some other aspects of the present disclosure, an illustrative method is disclosed. The method includes receiving a request to authenticate the user. The request includes a security threshold. The method also includes receiving a first selected authentication modality that is associated with a first security score. The method further includes transmitting a request for a second selected authentication modality based at least in part on a determination that the first security score is less than the security threshold.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 2A is a block diagram of a computer network with an authentication system in accordance with at least some embodiments of the present disclosure.

FIG. 2B is a block diagram of a computer network with an authentication system in accordance with at least some embodiments of the present disclosure.

Figure 1:
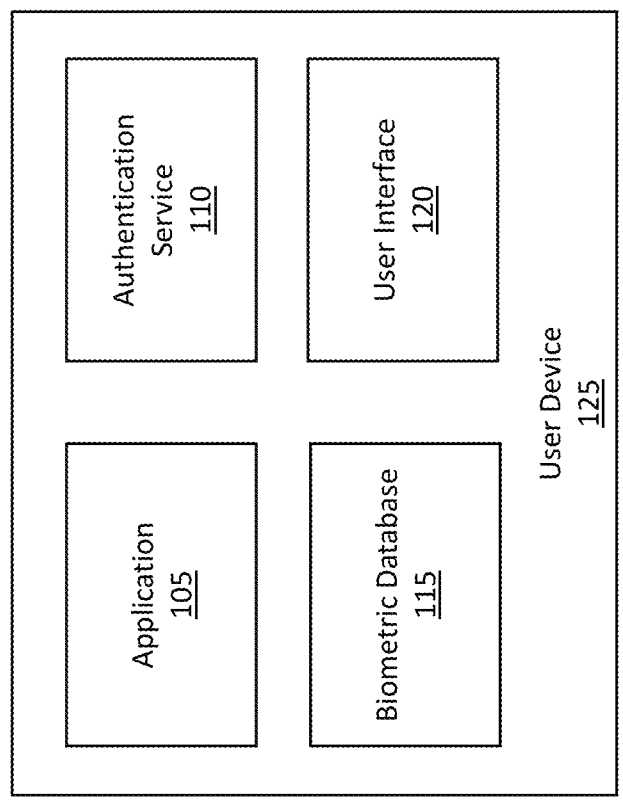
FIG. 1 is a block diagram of a user device with an authentication system in accordance with at least some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

Cyber security is increasingly important as more aspects of common life are incorporated into various online profiles. For example, many people allow computer programs or services to access information such as photos, background information, bank account numbers, and other personal or identifying information. Many services and computer programs require a username and password to access a user's profile or account.

However, to enhance security of a user's accounts over many online services, some users have different usernames and different passwords for each account. For example, a user may have a first username and password for a bank account, a second username and password for a social media account, a third username and password for an online forum, etc. In such an example, if one username and/or password is compromised for one account, the other accounts remain secure. However, it is difficult and cumbersome for a user to maintain such a high level of complexity in username and passwords, especially when the user may have dozens of different accounts. In various embodiments described herein, alternatives to passwords may be used to authenticate a user. In some embodiments, the user does not use passwords at all.

To enhance security, online service providers may use biometric data to ease the burden on the user while also making unauthorized replication of the user's credentials more difficult. For example, a fingerprint may be used to identify a user as an account holder of a web-based service. Use of such biometric data is easier on the user because the user does not need to remember a complex password. Further, such biometric data may include more bits of data than a typical password.

However, using biometric data may pose problems for service providers. For example, developing a biometric detection algorithm may be time consuming and/or expensive for some service providers, especially for smaller service providers such as startups or individuals. Further, some biometric modalities may require relatively large amounts of storage to store the biometric data. If the biometric data is stored on the device of the user, and if each of many service providers store such biometric data on the device, then essentially the same data may be stored numerous times on the same user device, which may be inefficient.

In various embodiments described herein, authentication of a user may be provided as a service. In such embodiments, multiple applications or computer programs may use a same service that provides authentication of users. Providing a service for authentication may ease efforts of application developers because the developers do not need to develop their own unique authentication algorithms and databases.

Moreover, users with multiple devices from which an application is accessed may have multiple sets of biometric data stored on each device. Eliminating the need for capturing and storing biometric data on multiple devices reduces computational costs and enhances efficiency. Moreover, having one set of biometric data against which biometric data is compared enhances consistency in the analysis of biometric data, reducing the likelihood for certain errors and improving security.

Additionally, biometric data can vary in their usefulness, availability, and level of security offered. For example, a user may have difficulty providing certain biometric data in certain situations, such as providing facial recognition data in low-lighting situations, fingerprint data when wearing gloves, or voice data when there is excessive ambient noise or when the user is in public or otherwise unable to speak freely. Moreover, certain biometric data may be more prone to error for certain users, making it relatively more difficult to acquire useful data or to make useful comparisons of acquired data with known data. For example, it may be relatively difficult for a user to reliably authenticate himself or herself with high confidence using facial recognition because the device may have originally acquired the biometric data when the user was not wearing glasses, and the device may not be well-suited to identifying the particular user when he or she is wearing eyewear. Additionally, in certain situations, a user's activities may not warrant the high level of security achieved by obtaining certain biometric data from a user and requiring a close match of the biometric data with known biometric data previously acquired from the user during registration. For example, a user's ability to view a notification from a weather application may not warrant the same level of security desired for accessing financial data.

Accordingly, adjusting which type of biometric data is used (based on, e.g., level of security required in a specific situation, and/or on ambient conditions which may be determined using input devices such as a device's camera, microphone, etc.), and how much of a match is required for authentication has many advantages. For example, having excessively stringent requirements for how closely biometric data matches verified data may result in an inefficient authentication process that may, for example, be more costly (in terms of time and computing resources) to process the biometric data. Requiring excessively high levels of confidence in the biometric data may also require additional retries due to failed attempts (e.g., because a sufficiently reliable reading is not obtained in a first or subsequent attempt), resulting in more demands on processing power, greater memory usage, reduced battery life, etc. Similarly, requiring a type of biometric data that is prone to error based on the user's surroundings or circumstances (e.g., voice recognition in a noisy environment) may tend to require: more costly analysis (which may, e.g., increase demands on processing power and memory and require more time); a greater number of failed authentication attempts; reduced confidence in the analysis of the biometric data (increasing likelihood of authentication failure in cases where greater confidence is desired, such as when accessing financial data or making payments); etc. Requiring the type and quality of biometric data that is suitable to a user's surroundings and circumstances, and that achieves an acceptable level of security, enhances the operation and functionality of devices and computing systems.

As described in greater detail below, an illustrative embodiment allows a service provider to allow a user to authenticate via various biometric modalities (e.g., recognition of face, voice, eye, palm, fingerprint, etc.) and to set various security thresholds for those modalities. In some embodiments, the service provider may provide the user with the option to select which modality to use to authenticate. In some embodiments, the service provider may select the option, and may require the user to authenticate via multiple modalities (e.g., to implement a multi-factor authentication arrangement). For example, for an online application where a high level of security is required, the user may be required to authenticate via both face and voice in order to enter the application. As another example, in an online banking application, authentication via a first modality may be required to gain access to the online banking application; however, if the user wishes to send a payment that exceeds a specified threshold, then the user may be required to authenticate again via a second modality. The online banking application may also set different security thresholds for the first and second modalities (e.g., the first modality may be set with a lower security threshold than the second modality). In some implementations, different security levels may be set for different conditions (e.g., ambient conditions detected using sensors on a device). As another example, a user may try to authenticate via a first modality, but then may be given the option to authenticate via a second modality if the attempt to authenticate via the first modality was unsuccessful (e.g., due to noisy ambient conditions, the user's attempt to authenticate via voice was unsuccessful, and so another modality is attempted). Such a robust integration of multiple authentication modalities improves the operation of the user device in connection with authenticating the user.

In some embodiments, if multiple applications operating on a user device utilize the authentication service, each application stores separate set of biometric data for the user. In some embodiments, a single service provider may provide numerous applications that each require authentication; however, each of the applications may access a common set of biometric data. In some embodiments, the applications of different service providers may each be certified for use with the authentication by a central certification authority (e.g., the provider of the authentication service), and all of the applications may access a common set of biometric data. In such arrangements, a more efficient utilization of storage space on the user device is achieved. In various implementations, comparisons of biometric data can be more consistent, thus enhancing security.

FIG. 1 is a block diagram of a user device 125 with an authentication system in accordance with an illustrative embodiment. The user device 125 includes an application 105, an authentication service 110, a biometric database 115, and a user interface 120. In alternative embodiments, the user device 125 may include additional, fewer, and/or different elements.

The user device 125 may be any suitable electronic device that may run the application 105. For example, the user device 125 may be a smartphone, a tablet, a laptop, a desktop, a server, etc. In an illustrative embodiment, the application 105 is software or a computer program that runs on the user device 125. For example, the application 105 may be a mobile banking application, a gaming application, a communications application (e.g., email, messaging, etc.), a travel application, a health tracking application, an image or photo application, etc. In some embodiments, the application 105 may operate entirely locally on the user device 125 (e.g., a photo manager application used to manage photos stored on the user device). In other embodiments, the application 105 may access remote resources (e.g., remote servers) to provide a service to the user, as described in greater detail below in connection with FIG. 2.

The authentication service 110 may run on the user device 125. In an illustrative embodiment, the authentication service 110 is integrated into the application 105. For example, the authentication service 110 may be provided to a developer of the application 105 via a software development kit (SDK). A developer of the application 105 may use the SDK within the application 105 to provide the authentication aspect of the application 105.

In an alternative embodiment, the authentication service 110 may run as an independent or supportive application on the user device 125. For example, the application 105 may call the authentication service 110 for authentication. In such an example, when a user is to log in or otherwise provide authentication, the authentication service 110 may run as a separate application and authenticate the user. Once the user is authenticated, the authentication service 110 may pass a confirmation to the application 105. A private key/public key authentication arrangement may be used to ensure that the confirmation received by the application 105 from the authentication service 110 is authentic. The application 105 may use the confirmation as an indication that the user is authenticated. As will be appreciated the amount and type of functionality that is provided by the authentication service 110 as opposed to by the application 105 may vary in different embodiments. Hence, while some features may be described as being provided by one of the applications 105, 110, in other embodiments, such features may be provided by the other of the applications 105, 110.

In the embodiment shown in FIG. 1, the user device 125 includes the biometric database 115. The biometric database 115 may store authentication credentials for users. For example, the biometric database 115 may store fingerprint data, palm print data, iris data, face recognition data, voice data, username data, password or passphrase data, etc. The biometric database 115 is stored on the user device 125, and is not transmitted via a network, thereby preventing interception of the biometric data by third parties and increasing security.

The user interface 120 provides a mechanism for the user to interact with the user device 125, the application 105, the authentication service 110, etc. In an illustrative embodiment, the user interface 120 is configured to receive and/or provide information from/to a user. The user interface 120 may be any suitable user interface. The user interface 120 may use various input technologies including, but not limited to, a touch screen, a keyboard, a keypad, a microphone, voice recognition, motion recognition, remote controllers, input ports, one or more buttons, cameras, fingerprint readers, palm readers, etc. to allow an external source, such as a user, to enter information into the user device 125. The user interface 120 may be used to navigate menus, adjust options, adjust settings, adjust display, provide biometric data, etc.

In an illustrative embodiment, multiple applications 105 may use the authentication service 110 and/or the biometric database 115 to authenticate a user. In some embodiments, a separate authentication service 110 is provided for each application 105, and the applications 105 may store and access separate sets of biometric data. In some embodiments, a single authentication service 110 is provided for all of the applications 105, and the applications 105 access a common set of biometric data. In some embodiments, the user device 125 may be utilized by multiple users, and each user may provide a set of biometric data. The authentication service 110 may then use that set of biometric data to verify the identity of the respective user for one or more applications 105. In certain implementations, this can avoid duplication of having multiple sets of data for multiple applications, and can save computational resources associated with acquiring and storing the data.

In some embodiments, a security threshold may be set to assess the authentication data provided by a user (e.g., a palm scan, facial scan, a fingerprint read, etc.). For example, when a palm is scanned (e.g., a picture of the palm is taken by a camera on the user device), a value (P) may be generated which provides a score of the strength of the match (e.g., similarity) between the scanned palm and the palm that was previously scanned during a registration process performed by the user when registering with the authentication service 110. In some embodiments, the authentication score is calculated as the probability that the scanned palm is the same palm that was previously scanned during a registration process performed by the user when registering with the authentication service 110. In situations where multiple factors of authentication are required, the probability P may then be calculated for each factor of authentication individually, or as a composite authentication score for all factors of authentication utilized. Other scoring mechanisms may also be used. In some implementations, a security threshold may indicate a minimum authentication score, P value, etc., and/or the number of scans, number of modalities, etc.

The security threshold required for authentication may be set by the application developers for their respective application 105. For example, different application developers may set different thresholds for accessing their applications 105 based on the perceived tradeoff between desired security and desired ease of use (i.e., ease of authentication). Additionally, a single application developer may also set various security thresholds that must be met by the user when the user is accessing a given application 105. For example, if the application 105 is an online banking application (e.g., used to access a remote server 245A/245B/245C, discussed below in connection with FIGS. 2A, 2B, and 2C), a "low" threshold (e.g., probability of match=$P_1$) may be set for tasks such as checking balances, but a "high" threshold (e.g., probability of match=$P_2$, where $P_2>P_1$) may be set for other tasks such as sending money to third party accounts. If the user then accesses the application with a palm scan and the probability P falls within the thresholds (i.e., $P_2 > P > P_1$), the user may be allowed to check balances but may be asked to perform further authentication tasks before being allowed to send money to third party accounts. For example, the user may be asked to rescan the user's palm (to achieve $P > P_2$) or may be asked to provide an additional factor of authentication (e.g., to perform a voice scan at a second specified security threshold) before being allowed to send money to third party accounts. In some embodiments, the determined probability P (or other score) may be transmitted from the authentication service 110 to the application 105 (e.g., again via a private key/public key authentication arrangement), such that the application 105 is aware of the level of certainty with which the user was authenticated. In other embodiments, the application 105 may specify the level of certainty that is required, and the application 105 may provide a response indicating whether that level of certainty has been met.

FIG. 2A is a block diagram of a network with an authentication system 200A in accordance with an illustrative embodiment. The system 200A includes a user device 225A, an application server 245A, and an authentication server 260A. The user device 225A includes an application 205A, an authentication service 210A, a biometric database 215A, and a user interface 220A, corresponding to application 105, authentication service 110, biometric database 115 and user interface 120, respectively, as described in connection with FIG. 1. Additionally, the user device 225A, the application server 245A, and the authentication server 260A include respective transceivers 230A, 255A, and 235A for communication with each other (e.g., via a communication network, such as a cellular network, the Internet, or a combination thereof). The authentication server 260A moreover includes an administrative dashboard 250A. In alternative embodiments, additional, fewer, and/or different elements may be used.

FIG. 2B is a block diagram of a network with an authentication system 200B in accordance with another illustrative embodiment. The system 200B includes a user device 225B, an application server 245B, and an authentication server 260B. The user device 225B includes an application 205B and a user interface 220B. Additionally, user device 225B, the application server 245B, and the authentication server 260B include respective transceivers 230B, 255B, and 235B for communication with each other (e.g., via a communication network, such as a cellular network, the Internet, or a combination thereof). The authentication server 260B moreover includes an authentication service 210B and a biometric database 215B. In alternative embodiments, additional, fewer, and/or different elements may be used.

Figure 2C:
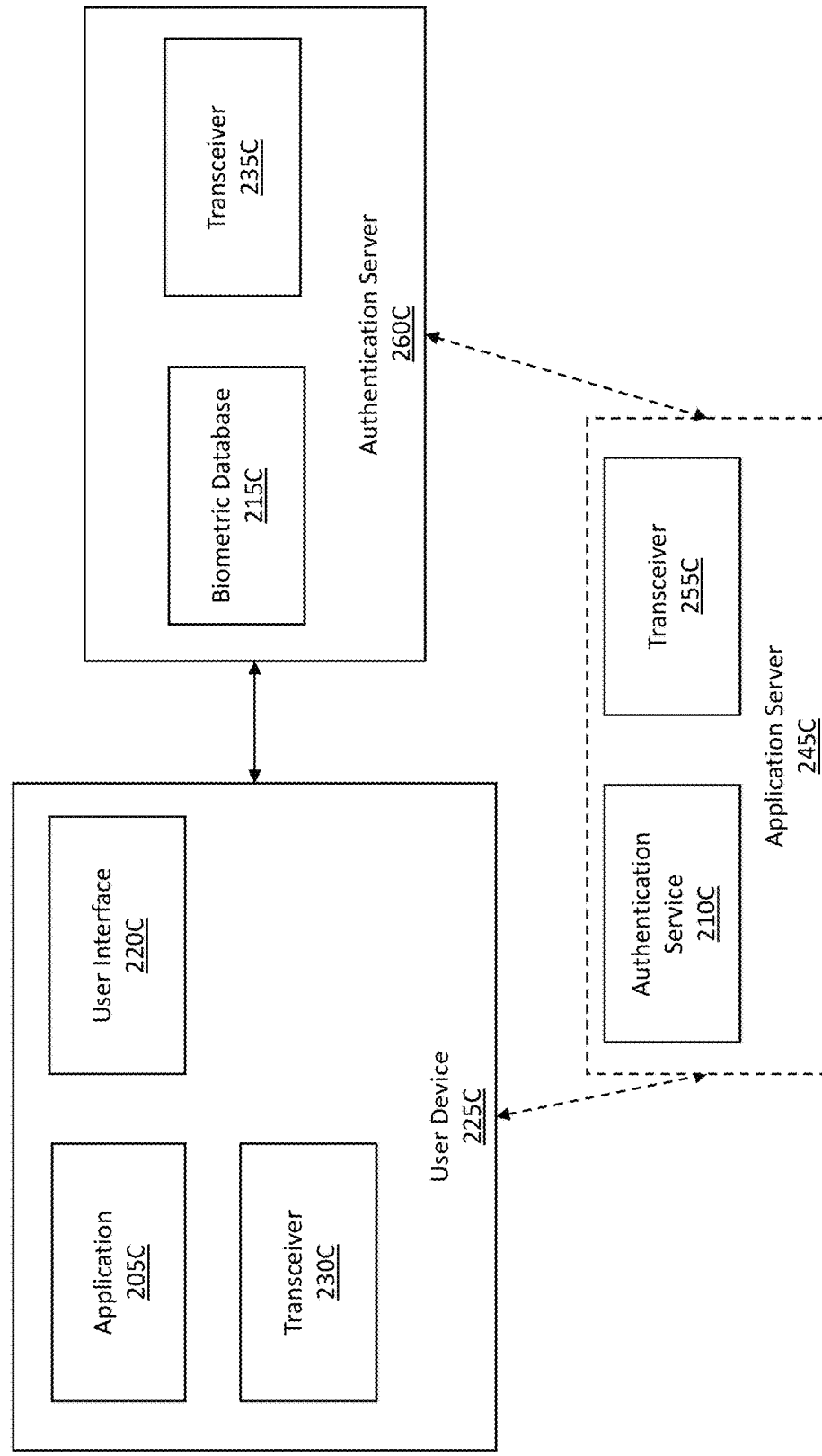
FIG. 2C is a block diagram of a computer network with an authentication system in accordance with at least some embodiments of the present disclosure.

FIG. 2C is a block diagram of a network with an authentication system 200C in accordance with another illustrative embodiment. The system 200C includes a user device 225C, an application server 245C, and an authentication server 260C. The user device 225C includes an application 205C and a user interface 220C. Additionally, the user device 225C, the application server 245C, and the authentication server 260C include respective transceivers 230C, 255C, and 235C for communication with each other (e.g., via a communication network, such as a cellular network, the Internet, or a combination thereof). The application server 245C moreover includes an authentication service 210C and the authentication server 260C includes a biometric database 215B. In alternative embodiments, additional, fewer, and/or different elements may be used.

In some implementations, the embodiment of FIG. 2A operates in the manner described above in connection with FIG. 1, except that additional features/functionality are provided by the application server 245A and the authentication server 260A. With regard to the application server 245A, as will be appreciated, in some instances, the service to be provided to the user is provided as an online service (e.g., online banking, social networking, etc.). In such instances, the application server 245A may be used to provide such services such that the application server 245A supports the application 205A. For example, the application 205 may provide an interface for the user to interact with a program running on the application server 245A. In another example, the application 205A may access data stored on the application server 245A. In some embodiments, the application 205A may be a thin client that is primarily used to ensure that the user has been authenticated and then to provide a portal for the user to access functionality that resides on the application server 245A. In an online environment, the request for user authentication may be initiated by the application server 245A instead of by, or in addition to, the application 205A. A private key/public key authentication arrangement may be used to ensure that the confirmation of authentication received by the application server 245A from the authentication service 210 is authentic.

With regard to the authentication server 260A, in some embodiments, the authentication server 260A provides an administrative dashboard 250A. The administrative dashboard 250A may be configured to permit the service provider to change settings in the authentication service 210A after the authentication service 210A has been deployed on a user device 225A. For example, if a service provider decides to increase security thresholds for one or more aspects of the application 205A, such changes may be administered through the administrative dashboard 250A. As another example, the service provider may decide to enable or disable certain authentication modalities (e.g., the service provider may decide to no longer offer iris scanning as an authentication mechanism). As another example, the service provider may decide to reconfigure when a user is required to authenticate using multiple factors of authentication. As another example, the service provider may decide to reconfigure which authentication modality a user is required to use in specific circumstances.

As will be appreciated the amount and type of functionality that resides on the user device, the application server, and the authentication server may vary in different embodiments. For example, while some features may be described as being provided by one of the elements 225A/225B, 245A/245B, 260A/260B, in other embodiments, such features may be provided by another one of the elements 225A/225B, 245A/245B, 260A/260B, or such features may be provided in distributed fashion by multiple ones of the elements 225A/225B, 245A/245B, 260A/260B. For example, in certain implementations, an application running on a user device may communicate with an application server which communicates with an authentication server for authentication (i.e., authentication may be achieved via the application server). In other implementations, an application on a user device may communication directly with an authentication server for authentication and, if authentication is successful, provide information or functionality directly or via an application server (i.e., authentication may be achieved without involvement by the application server).

Figure 3:
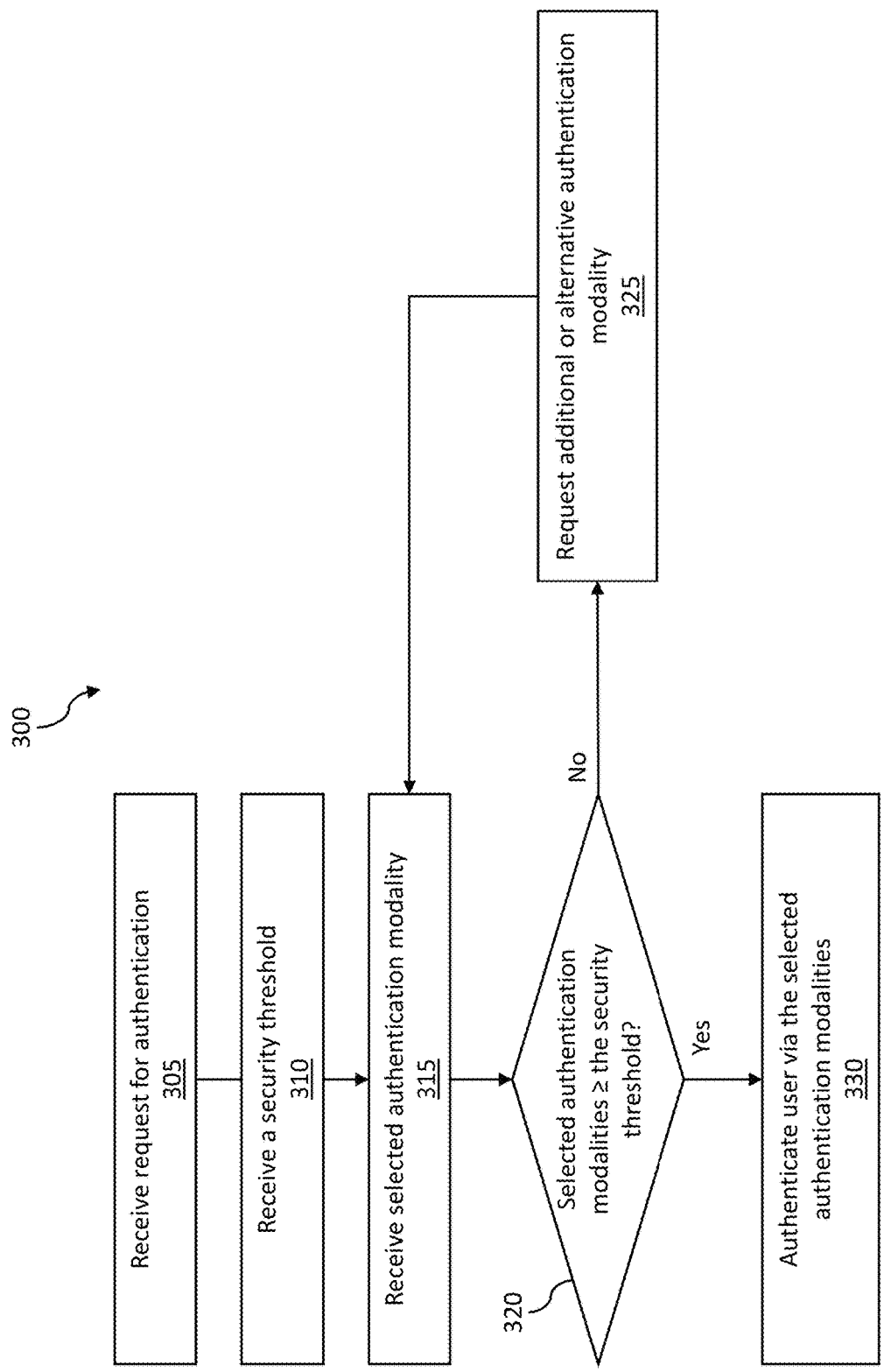
FIG. 3 is a flow chart of a method for authenticating a user in accordance with at least some embodiments of the present disclosure.

FIG. 3 is a flow chart of a method 300 for authenticating a user in accordance with an illustrative embodiment. In alternative embodiments, additional, fewer, and/or different operations may be performed. Also, the use of this flow chart and/or arrows is not meant to be limiting with respect to the order of operations or flow of information. For example, in alternative embodiments, two or more operations may be performed simultaneously.

An operation 305 of the method 300 includes receiving a request for authentication. In an illustrative embodiment, the authentication service 210A (on user device 225), authentication service 210B (on authentication server 260B), or authentication service 210C (on application server 245C) receives the request for authentication. (While method 300 is described in the context of the arrangement of FIGS. 2A, 2B, and 2C, it will be appreciated that the discussion is equally applicable to FIG. 1, except as relates to the application server 245A/245B/245C and the authentication server 260A/260B/260C). In various embodiments, the request for authentication may be received from application 205A/205B/205C. For example, the application 205A/205B/205C (or the application server 245A/245B/245C) may request that a user is authenticated before the user may have access to information or services via the application 205A/205B/205C (or the application server 245A/245B/245C).

In some embodiments, as previously indicated, the application 205A/205B/205C may have multiple levels of security that are required for access to different data or different tasks. For example, a mobile banking application may have a relatively low security threshold to view account balances, a medium security threshold to transfer funds between accounts, and a relatively high security threshold to transfer funds out of an account to a third party or to change profile settings. In such an embodiment, operation 305 may involve the authentication service receiving a request for a new/higher level of authentication.

In the operation 310, a security threshold is received. In an illustrative embodiment, the security threshold is received at the authentication service 210A/210B/210C (e.g., from the application 205A/205B/205C, from the application server 245A/245B/245C, or from device memory). The security threshold may be indicative of a level of certainty required for authentication, as previously discussed. In an illustrative embodiment, the security threshold may be determined or selected by developers/administrators of the application 205A/205B/205C. For example, a security threshold for access to a saved video game may be lower than a security threshold for access to banking information. If the user is only permitted to authenticate via specific modalities, that information may be received as well (e.g., as part of operation 310).

In some embodiments, the security threshold and/or the permitted authentication modality/modalities may be specified by the user rather than by the developers/administrators of the application 205A/205B/205C. For example, a first user may use the application 205A/205B/205C to set up a virtual meeting (e.g., a video conference). The first user may send a meeting invitation to a second and third user (or any other number of users). The first user may set a security threshold and/or permitted authentication modality/modalities for the second and third users to join the virtual meeting. The first user may also specify whether multiple factors of authentication (i.e., multiple authentication modalities) are required. At the meeting time, each user may log into their respective accounts on their respective user devices 125, 225A/225B/225C and attempt to join the meeting. When joining the meeting, each respective user may provide the required authentication via the pre-approved authentication modality or modalities.

In some embodiments, the operation 305 may be combined with the operation 310. For example, the request for authentication may include the security threshold. In some embodiments, the security threshold is already known (e.g., constant and/or predetermined) and is received from device memory. In certain implementations, a default security threshold may be used unless/until the default is changed.

In an operation 315, a selected authentication modality is received. In an illustrative embodiment, the security threshold is received at the authentication service 210A/210B/210C (e.g., from the application 205A/205B/205C, from the application server 245A/245B/245C, or from device memory). Example authentication modalities include fingerprints, palm prints, face recognition, voice recognition, eye or iris recognition, etc. In an illustrative embodiment, the operation 315 includes receiving from the user a preferred authentication modality. Following the banking example above, a user may wish to log into his or her account to view account balances. The user may open or run the banking application, and the user may be presented with a user interface that allows the user to select an authentication modality to use to log in. In some implementations, operation 315 may also include receiving a number of failed attempts that may be allowed, a number that could be set higher when security concerns are lower and/or when certain ambient conditions are met (e.g., allowing a higher number of failed voice recognition attempts in noisy environments, a higher number of failed palm scans when temperatures are higher and/or when the user is determined to be exercising, a higher number of fingerprint scans when the user device is jittery based on accelerator readings, etc.).

In another illustrative embodiment, the operation 315 includes receiving the selected authentication modality from the application 205A/205B/205C or the application server 245A/245B/245C that requests the authentication. That is, the application 205A/205B/205C or application server 245A/245B/245C may prescribe one or more allowable authentication modalities that are suitable for the particular user. For example, in a travel application running on a smartphone, the travel application may require a specific authentication modality to authenticate a user for a specific task. For instance, the travel application may require a palm print for a user to check into a flight via the travel application. In an illustrative embodiment, the application that requests the authentication may prescribe a subset of the available authentication modalities that may be used to verify a user, and the user may select one or more of the authentication modalities in the subset to verify the user. In some embodiments, the authentication service 210A/210B/210C may prescribe allowable authentication modalities.

In an illustrative embodiment, the operation 315 may include the application 205A/205B/205C determining one or more suitable authentication modalities to be used based on environmental conditions. For example, eye scans generally have high accuracy, but may not be most suitable for individuals that wear glasses. In some instances, an eye scan may be awkward or conspicuous for a user. In an illustrative embodiment, the operation 315 may identify an eye scan as a suitable authentication modality when the user does not wear glasses and/or is not in a public space. In some implementations, a hardware component of the device may be used for an initial check to determine if the user is wearing glasses, and if so, an eye scan modality may be deemed unsuitable. If the device includes hardware components, separate from a camera, that are dedicated to eye scans, the initial scan may be performed by either the dedicated hardware components or by the camera. In some implementations, the initial check may be a "pre-processing" step in which an eye scan (whether performed using dedicated hardware or the camera) is analyzed more superficially, not for authentication (i.e., for how closely the biometric data matches known biometric data) but rather for whether eyeglasses are detected/recognized. Such superficial analyses would be computationally less intensive than the analysis of the biometric data for authentication purposes. If it is determined that the user is not wearing glasses, the same eye scan can be analyzed for authentication purposes.

In certain implementations, the glasses are "smart glasses" that are capable of communicating with the user device 225A/225B/225C. In such implementations, the suitability of an eye or facial scan may be determined by communicating with the smart glasses and receiving an indication from the smart glasses as to whether the glasses are being worn or otherwise "active" or in use. For example, user device 225A/225B/225C may detect whether smart glasses (which may have been previously paired with the device) are in the device's vicinity (e.g., within range of a Bluetooth or near-field communication device), and if so, wirelessly transmit a request for an indication as to whether the smart glasses have detected that the smart glasses are currently being worn by the user. If so, the suitability of an eye or facial scan modality may be determined (potentially more easily and more quickly) without having the user device perform an eye or facial scan (thus reducing the computational costs and inefficiency of an avoidable scan).

In other implementations, the suitability of an eye or facial scan may be determined not by whether the user is wearing glasses, but based on ambient conditions. For example, a photodetector, camera, or other hardware component can be used to identify lighting conditions in the user's surroundings. If lighting conditions are in an acceptable range, then the eye or facial scan modality may be deemed suitable. For example, if a photodetector or camera detects that ambient light (brightness) is below a minimum threshold/level (i.e., too dim) or above a maximum threshold/level (i.e., too bright), then the eye or facial scan modality may be deemed unsuitable.

In some implementations, the suitability of a modality may be based on the location of the user. The application 105 and/or the application 205A/205B/205C may make location determinations based on any available information, such as maps, global positioning services, location services, etc. For example, the location of a user (e.g., in a place of worship, as determined using, e.g., detected position cross-referenced with a directory, online database, etc.) may make certain modalities like eye scans, facial scans, or voice recognition awkward, undesirable, or otherwise unsuitable as compared with other modalities like fingerprint scans.

In another example, voice recognition is generally suitable because it uses ubiquitous hardware (e.g., a microphone). In some instances, voice recognition is not suitable when there is significant background/ambient noise (e.g., in noisy environments). For example, operation 315 may identify voice recognition as an unsuitable authentication modality when there is significant noise (as determined using, e.g., the device's microphone or other sound detector). If a microphone or other sound detector detects that ambient sounds (loudness) is above a maximum threshold/level (i.e., too loud), then voice recognition may be deemed to be an unsuitable modality. Also, recording a voice message for authentication may be conspicuous or awkward for a user in public. In an illustrative embodiment, the application 205A/205B/205C may identify voice recognition as a suitable authentication modality when the user is not in a public space or is alone.

In yet another example, facial recognition has the benefit of using hardware that is generally available on many electronic devices (e.g., a user or front-facing camera on a smartphone or a laptop). In environments with low light, facial recognition may not be accurate. Also, some users may feel that taking a picture of themselves (e.g., taking a "selfie") in public is awkward. In an illustrative embodiment, the application 105 and/or the application 205A/205B/205C may identify face recognition as a suitable authentication modality when the user is not in a public space and/or when there are suitable lighting conditions. The lighting conditions may be determined using a camera of the user device 125 or the user device 225A/225B/225C.

Another example authentication modality is a palm print. Ubiquitous hardware such as cameras may be used to receive a palm print (e.g., 2D palm print, 3D palm print, etc.). Palm prints may be highly accurate and may be captured quickly. In some instances, palm prints may be difficult to capture correctly because the user may have a difficult time positioning the user's palm correctly on the input device. For example, a user who is walking or riding in a bouncy vehicle may have a hard time accurately placing his or her hand on a smartphone. In an illustrative embodiment, the application 105 and/or the application 205A/205B/205C may determine that a palm print is a suitable authentication modality when the user device 125 or the user device 225A/225B/225C is relatively stable (e.g., not bouncing around). Such a determination may be made using accelerometers of the user device 125 or the user device 225A/225B/225C. In some instances, palm prints may be difficult to capture if the user has sweaty palms. In an illustrative embodiment, the application 105 and/or the application 205A/205B/205C may determine that a palm print is a suitable authentication modality when the user is not likely to have sweaty hands. The application 105 and the application 205A/205B/205C may make such a determination based on information such as ambient temperature (e.g., based on weather information for the user's geolocation as provided by a weather service). If the ambient temperature is above a threshold (e.g., too hot), the application 205A/205B/205C may determine that the user is more likely than usual to have sweaty palms. In another example, other information may be used to determine a state of the user. For instance, using accelerometers, location services, and/or wearable devices (such as fitness trackers), the application 105 or the application 205A/205B/205C may determine that the user is exercising and is likely to have sweaty palms.

Another authentication modality example is fingerprint. Fingerprint capture has the benefit of having a fast capture and high accuracy. Also, providing a fingerprint has been generally accepted by the public and is not generally awkward or conspicuous. However, not all user devices include hardware suitable for reading fingerprints. In some instances, the manufacturer of the user device 225A/225B/225C may not provide fingerprint data to applications running on the user device 225A/225B/225C. For example, various cell phone manufacturers provide fingerprint detectors on their devices, but do not provide the fingerprint data to applications running on those devices. Also, in some instances, rough, worn, or dirty fingers may not provide a suitable fingerprint for authentication. In an illustrative embodiment, the application 205A/205B/205C may determine that fingerprints are a suitable authentication modality if a fingerprint is likely to provide a suitable reading. For example, if previous recent attempts to receive a suitable fingerprint were unsuccessful, it may be determined that fingerprints are not a suitable authentication modality. Also, sweaty fingers may inhibit reading of a useable fingerprint for authentication. In an illustrative embodiment, the application 205A/205B/205C may determine that a fingerprint is a suitable authentication modality when the user is not likely to have sweaty fingers (e.g., as explained above with respect to palm prints). In certain implementations, the number of failed attempts allowed may be dependent on environmental conditions.

In an operation 320, a value (P) is generated which represents the probability (or other score) that the scanned biometric (e.g., scanned palm) is the same biometric that was previously scanned (e.g., previously scanned palm) during a registration process performed by the user when registering with the authentication service 110A/110B/110C. It is then determined whether the probability P exceeds the security threshold. As previously indicated, in some embodiments, the probability P associated with multiple authentication scans from multiple modalities may be combined (e.g., summed, weighted sum, averaged, weighted average, etc.) to create a composite score which may be evaluated against the security threshold. In other embodiments, a single authentication modality that has a probability P greater than the security threshold for a single biometric may be required.

As discussed above, any suitable combination of security thresholds, selected authentication modalities, and types of scoring authentication modalities may be used. In some embodiments, the security threshold provided to the application developer for selection may be any suitable number of discrete levels. For example, the security threshold may be one of: high, medium, or low. In such an embodiment, each of the discrete options may be associated with a number within a range of probabilities. For example, the "low security" option may correspond with a probability (or other score) in the range of $P_1$ to $P_2$, the "medium security" option may correspond with a probability in the range of $P_2$ to $P_3$, and the "high security" option may correspond with a probability greater than $P_3$, where $0<P_1<P_2<P_3$. In another example, the security threshold may be one of: confidential, secret, top secret, or compartmented. In some embodiments, the security thresholds may not be hierarchical based on an amount of security. In such embodiments, the selected security thresholds may be based on any other suitable feature, such as allowed authentication modalities. In alternative embodiments, any suitable options, number of options, and corresponding scores may be used.

If, in the operation 320, the selected authentication modality is less than the security threshold, then in an operation 325, an additional and/or an alternate authentication modality is requested. Following the example above in which the user initially selects a fingerprint authentication modality to change account settings, an alternative (e.g., more secure) modality may be requested from the user. As shown in FIG. 3, the method 300 may return to the operation 315 in which a user may select a modality. For example, the user may select to authenticate using face recognition, which may be associated with a security level of seventy-eight. In the operation 320, it may be determined that the face recognition modality is greater than the security level for changing account settings.

If, in the operation 320, the selected authentication modality is greater than or equal to the security threshold, then in an operation 330, the user is authenticated (or not) via the selected authentication modalities. For example, the received authentication data (e.g., fingerprint, password, face scan, etc.) may be compared to an authentication database, such as the biometric database 115 or the biometric database 215. If the received authentication data matches authentication data stored for the user in the database, the user may be authenticated. If the received authentication data matches authentication data stored for the user in the database, the user may be authenticated.

Figure 4:
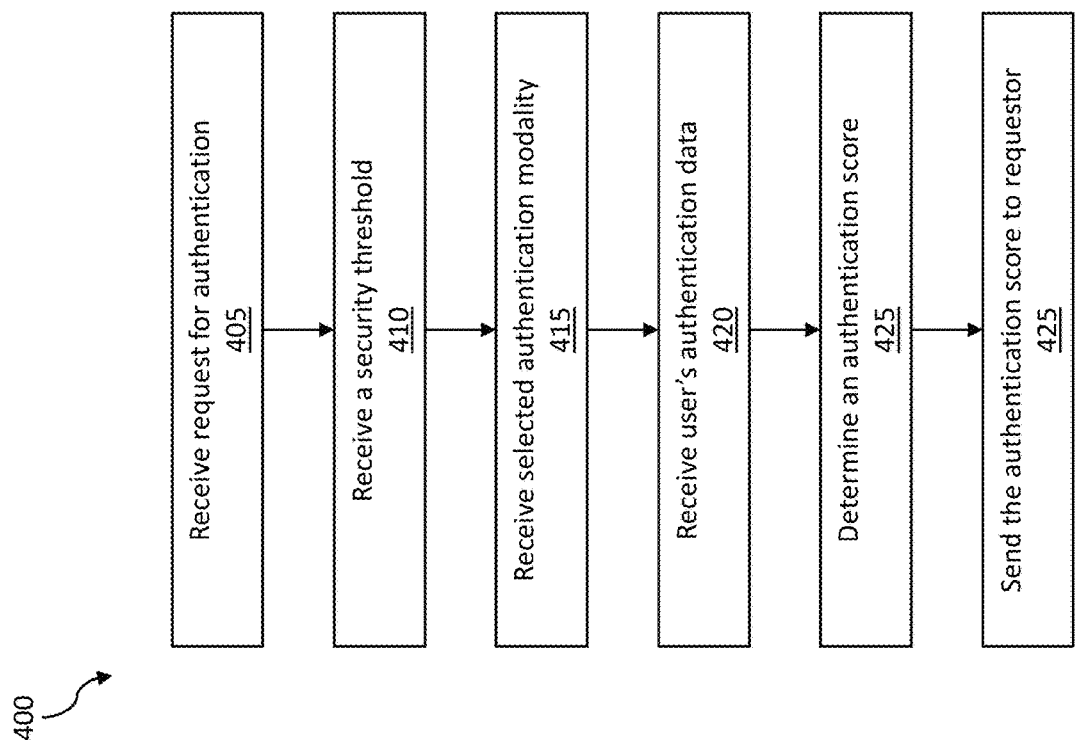
FIG. 4 is a flow chart of a method for authenticating a user in accordance with at least some embodiments of the present disclosure.

FIG. 4 is a flow chart of a method 400 for authenticating a user in accordance with an illustrative embodiment. In alternative embodiments, additional, fewer, and/or different operations may be performed. Also, the use of this flow chart and/or arrows is not meant to be limiting with respect to the order of operations or flow of information. For example, in alternative embodiments, two or more operations may be performed simultaneously.

An operation 405 of the method 400 includes receiving a request for authentication. In some implementations, this request may be received by, for example, authentication server 260A/260B/260C from application 205A/205B/205C, respectively, or from 245A/245B/245C, respectively. At operation 410, a security threshold is received. In certain implementations, the authentication server 260A/260B/260C may receive the security threshold. In illustrative embodiments, the security threshold may indicate a confidence level/probability of a match that must be surpassed for successful authentication. In example implementations, the confidence level may correspond with, for example: a requirement for a certain modality (e.g., eye scans for relatively higher security, voice recognition for relatively lower security); certain combinations of available or acceptable modalities (e.g., an eye scan or alternatively the combination of a fingerprint scan and voice recognition); a certain probability of match based on an analysis of the current biometric data as compared with the known biometric data (e.g., a confidence score correlating with confidence that the user currently providing the biometric data is the same user that provided the biometric data during registration are the same person); or any combination of the above (e.g., a requirement for a fingerprint scan with a probability of 95%, voice recognition with a probability of 99%, an eye scan with a probability of 90%, a combination of fingerprint scan at 80% and voice recognition at 80%, etc.).

At operation 415, the authentication modality is received. The authentication modality selection may be received via, for example, application 205A/205B/205C, authentication service 210A/210B/210C, administrative dashboard 250A, etc. At operation 420, the user's authentication data may be received. In certain implementations, the authentication data is captured using user device 225A/225B/225C. At operation 425, an authentication score may be determined (by, e.g., the authentication server 260A/260B/260C. This determination may then, at operation 425, be sent to a requestor (e.g., the authentication service 210A/210B/210C).

Figure 5B:
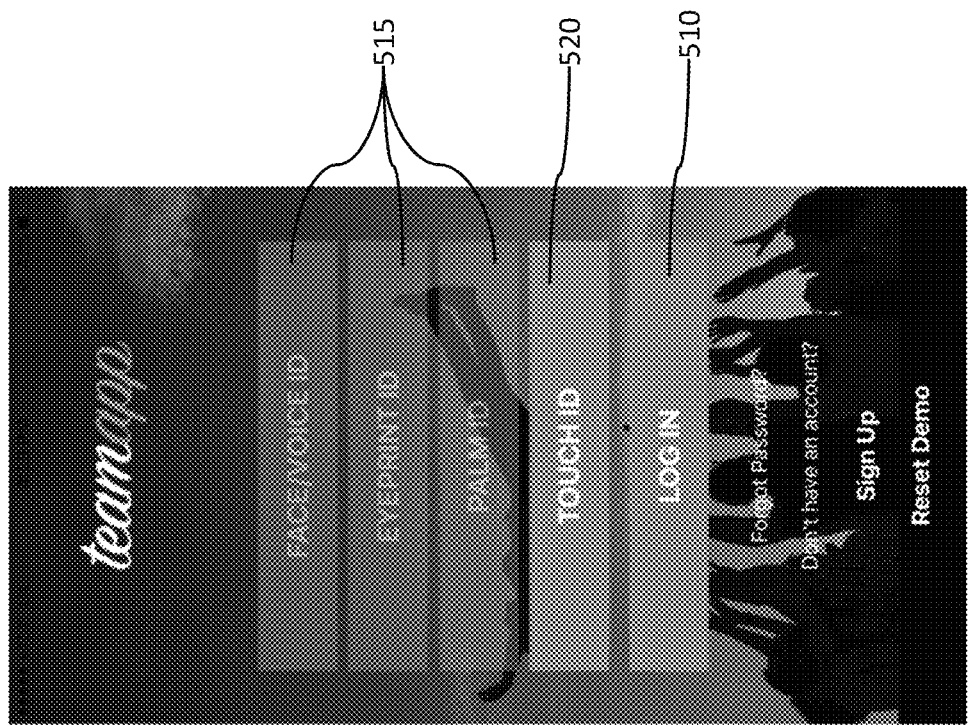
FIGS. 5A-5F are screenshots of a user interface in accordance with at least some embodiments of the present disclosure.
Figure 5A:
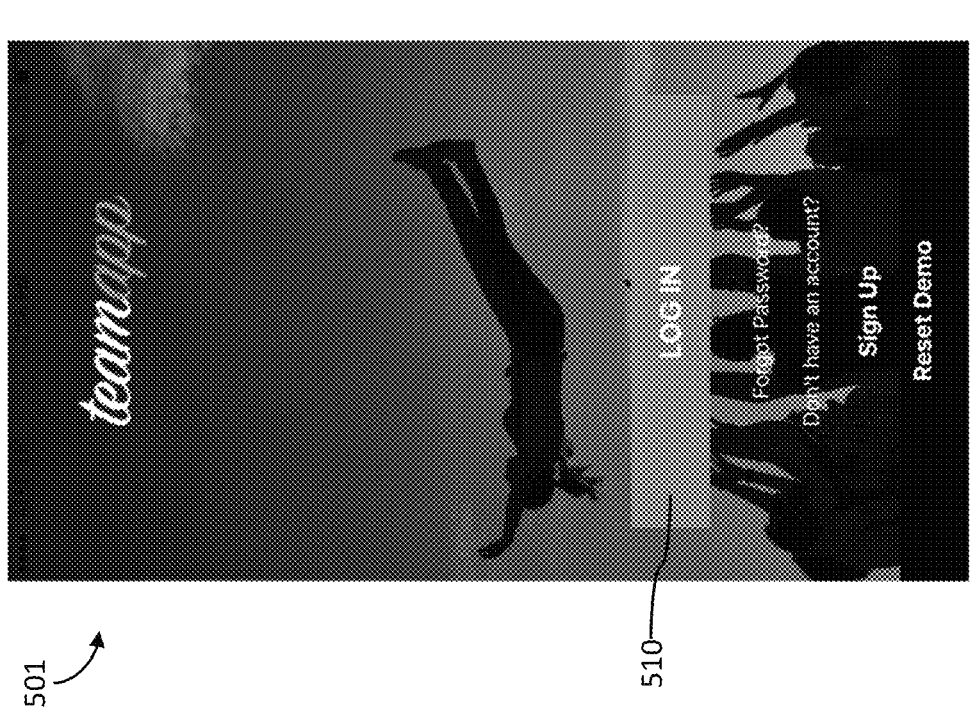

FIGS. 5A-5F are screenshots of a user interface in accordance with an illustrative embodiment. As with the other Figures, the screenshots of FIGS. 5A-4F are meant to be illustrative only and not meant to be limiting with respect to design, layout, navigability, etc. The screenshots of FIGS. 5A-4F are of an application for organizing a virtual meeting, but as discussed above, the various features may be implemented in an application for any other suitable purpose other than meetings such as banking, document storage (e.g., cloud storage), or any other application requiring authentication of the user.

The screenshot 501 of FIG. 5A is an illustrative log-in screen. The screenshot 501 includes a log-in button 510. When the log-in button 510 is pressed, the user may be presented with authentication modalities that may be used to log in. For example, the screenshot 501 includes unavailable authentication modalities 515 and available authentication modalities 520. As explained above, the application or the authentication service may prescribe which authentication modalities may be used to authenticate the user. In the screenshot 502, "TOUCH ID" (e.g., a fingerprint) is the only available authentication modality 520, and "FACE/VOICE ID," "EYEPRINT ID," and "PALM ID" are the unavailable authentication modalities 515. In the embodiment of FIG. 5B, the only allowable selection for the user is the "TOUCH ID" button. In the screenshot 503 of FIG. 5C, "FACE/ VOICE ID," "EYEPRINT ID," "PALM ID," and "TOUCH ID" are all available authentication modalities 520. In such an example, the user may select any one (or more) of the available authentication modalities 520 to authenticate the user. FIGS. 5B and 5C also represent potential screen shots that may be provided by the administrative dashboard 250. For example, the administrative dashboard 250 may provide information to the application developer/administrator as to which modalities have been selected as being available for user authentication.

Figure 5D:
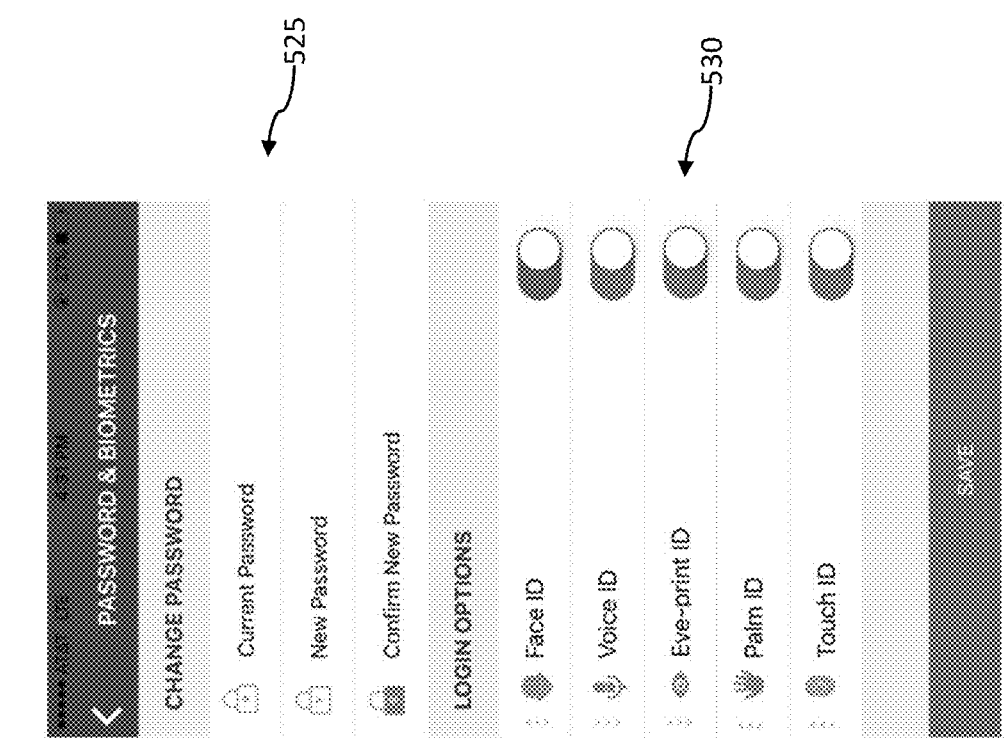
Figure 5C:
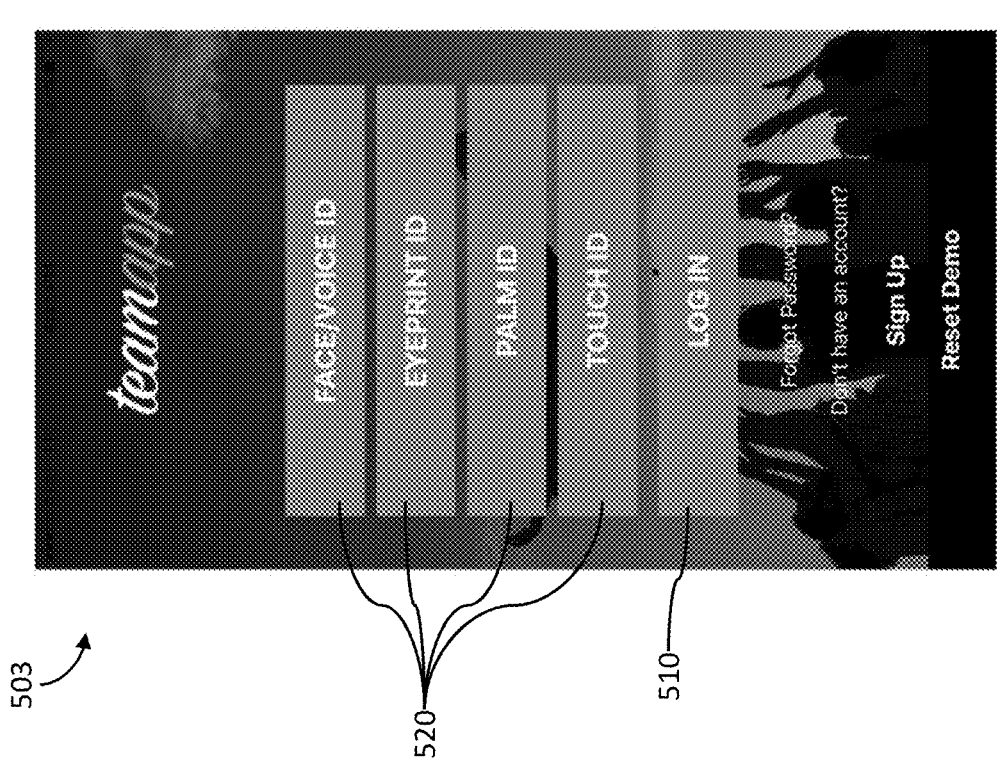

The screenshot 504 of FIG. 5D is a view of user settings. The change password area 525 may be used to change a password. In an alternative embodiment, the change password area 525 may facilitate changing the authentication data for the authentication modalities. For example, the user may add or change a fingerprint. The login options area 530 may allow a user to select authentication modalities that the user will provide. For example, if a user is unable or uncomfortable providing one or more authentication modalities, the user may de-select the suitable authentication modalities. In such an example, the de-selected modalities may not be provided as available authentication modalities 520. FIG. 5D also represents a potential screen shot that may be provided by the administrative dashboard 250. For example, the administrative dashboard 250 may provide information to the application developer/administrator to select which modalities may be available for user authentication.

Figures 5E, 5F:
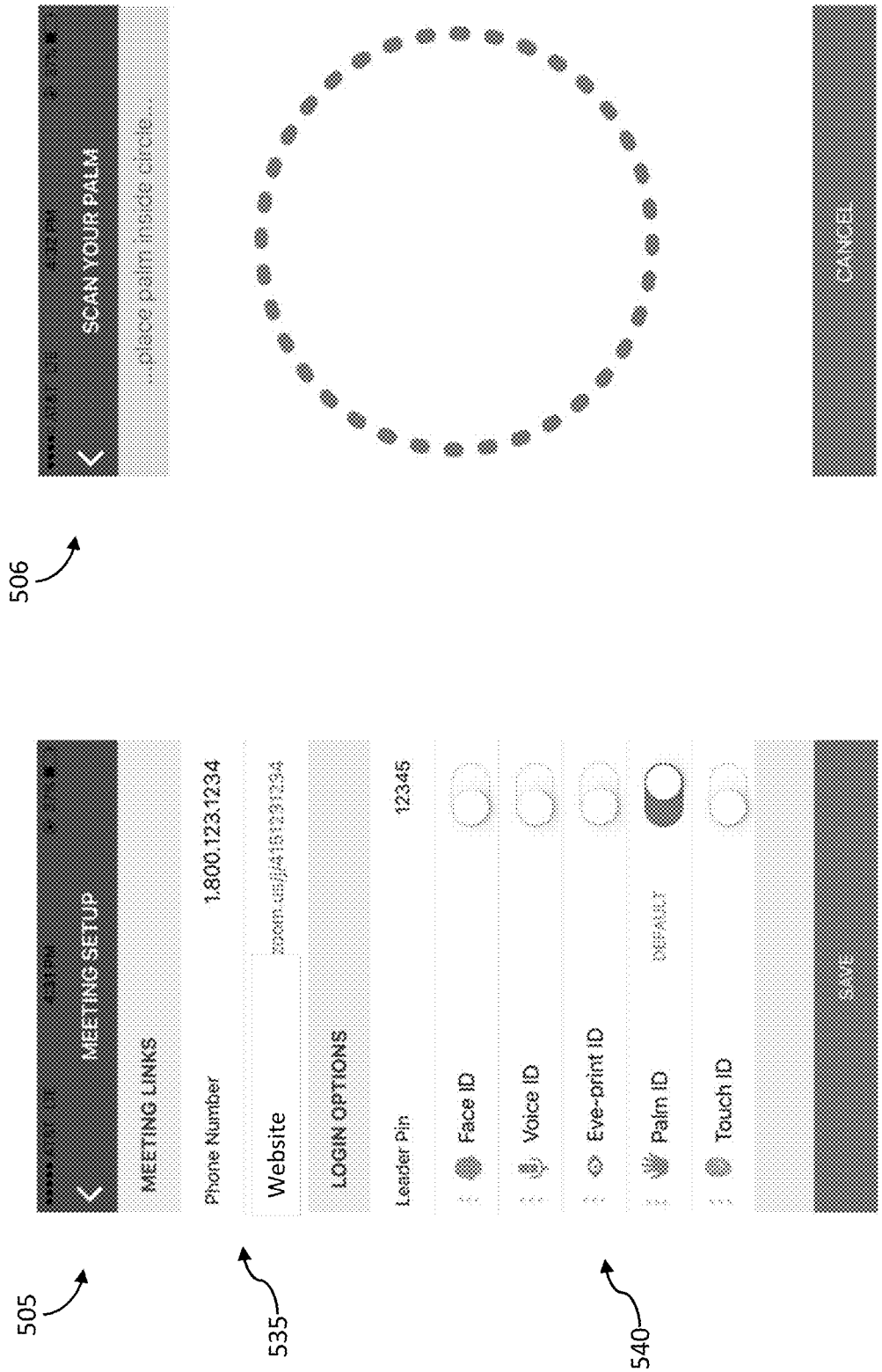

The screenshot 505 of FIG. 5E is a view of a meeting setup screen. The screenshot 505 includes meeting information 535 that is to be provided to authenticated users. For example, once authenticated, a user may be provided with a phone number to join the conference call and a website for access to a screen sharing or video associated with the meeting. The screenshot 505 also includes login options 540. The login options 540 allows a leader of the meeting to select which authentication modalities may be used by other users to join the meeting and/or receive the meeting information 535.

The screenshot 506 of FIG. 5F is a view presented to a user that has selected to provide a palm print as the authentication modality. For example, the screenshot 506 may be presented via a touch screen, and the dashed circle may indicate to the user where the palm print will be read. The touch screen may read the palm of the user once the user touches his or her palm to the screen.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated.

Other substitutions, modifications, changes and omissions may be made in the design, operating conditions and arrangement of the embodiments without departing from the scope of the present disclosure as expressed in the appended claims.

What is claimed is:

1. A method for authenticating a user for access to an application, comprising:
   receiving a selection of an operation associated with the application;
   receiving a security threshold associated with the operation from a third party, wherein the security threshold comprises a minimum authentication score;
   assessing environmental conditions associated with a device on which a user interface is displayed to determine a suitable subset of a plurality of biometric authentication modalities for authenticating the user and an unsuitable subset of the plurality of biometric authentication modalities not available for authenticating the user;
   displaying, via the user interface, the plurality of biometric authentication modalities, wherein the suitable subset of the plurality of biometric authentication modalities is selectable by the user but the unsuitable subset of the plurality of biometric authentication modalities are not selectable by the user;
   receiving, via the user interface, a selection of a first biometric authentication modality from the suitable subset of the plurality of biometric authentication modalities;
   receiving first user authentication data for the first biometric authentication modality from the suitable subset of the plurality of biometric authentication modalities;
   comparing the first user authentication data for the first biometric authentication modality with previously-determined biometric data;
   determining a first authentication score based on the comparison of the first user authentication data with the previously-determined biometric data;
   comparing the first authentication score to the security threshold;
   receiving, based on a determination that the first authentication score is less than the security threshold, second user authentication data for a second biometric authentication modality from the suitable subset of the plurality of biometric authentication modalities;
   determining a second authentication score based on a comparison of the second user authentication data with the previously-determined biometric data; and
   authenticating the user in response to determining that the second authentication score satisfies the security threshold.

2. The method of claim 1, wherein assessing the environmental conditions includes determining a presence of a facial accessory of the user, and wherein the first biometric authentication modality of the plurality of biometric authentication modalities is an eye scan.

3. The method of claim 1, wherein assessing the environmental conditions includes receiving an indication from smart glasses associated with the user.

4. The method of claim 1, wherein assessing the environmental conditions includes determining a location of the device, and wherein the first biometric authentication modality of the plurality of biometric authentication modalities is a facial scan modality.

5. The method of claim 1, wherein assessing the environmental conditions includes determining an illumination level associated with an environment surrounding the device, and wherein the first biometric authentication modality of the plurality of biometric authentication modalities is a facial scan modality.

6. The method of claim 1, wherein assessing the environmental conditions includes determining a noise level associated with an environment surrounding the device, and wherein the first biometric authentication modality of the plurality of biometric authentication modalities is a voice recognition modality.

7. The method of claim 1, wherein assessing the environmental conditions includes determining a stability level of the device, and wherein the first biometric authentication modality of the plurality of biometric authentication modalities is a palm print modality.

8. The method of claim 1, wherein assessing the environmental conditions includes determining a temperature associated with an environment surrounding the device, and wherein the first biometric authentication modality of the plurality of biometric authentication modalities is a fingerprint scan.

9. A device for authenticating a user for access to an application, comprising:
  a user interface configured to receive user authentication data, wherein the user authentication data comprises user biometric data from a user;
  a memory configured to store pre-registered biometric data; and
  a processor communicatively coupled to the user interface and the memory, wherein the processor is configured to:
    receive a selection of an operation associated with the application; receive a selection of an operation associated with an application;
    receive a security threshold associated with the operation from a third party, wherein the security threshold comprises a minimum authentication score;
    assess environmental conditions to determine a suitable subset of a plurality of biometric authentication modalities for authenticating the user and an unsuitable subset of the plurality of biometric authentication modalities not available for authenticating the user;
    display, via the user interface, the plurality of biometric authentication modalities, wherein the suitable subset of the plurality of biometric authentication modalities is selectable by the user but the unsuitable subset of the plurality of biometric authentication modalities are not selectable by the user;
    receive, via the user interface, a selection of a first biometric authentication modality from the suitable subset of the plurality of biometric authentication modalities;
    receive first user authentication data for the first biometric authentication modality from the suitable subset of the plurality of biometric authentication modalities;
    compare the first user authentication data for the first biometric authentication modality with previously-determined biometric data;
    determine a first authentication score based on the comparison of the first user authentication data with the previously-determined biometric data; compare the first authentication score to the security threshold;
    receive, based on a determination that the first authentication score is less than the security threshold, second user authentication data for a second biometric authentication modality from the suitable subset of the plurality of biometric authentication modalities;
    determine a second authentication score based on a comparison of the second user authentication data with the previously-determined biometric data; and
    authenticate the user in response to determining that the second authentication score satisfies the security threshold.

10. The device of claim 9, wherein the processor is configured to assess the environmental conditions to determine a presence of a facial accessory of the user, and wherein the first biometric authentication modality of the plurality of biometric authentication modalities is an eye scan.

11. The device of claim 9, wherein the processor is configured to assess the environmental conditions to determine a location of the device, and wherein the first biometric authentication modality of the plurality of biometric authentication modalities is a facial scan modality.

12. The device of claim 9, wherein the processor is configured to assess the environmental conditions to determine an illumination level associated with an environment surrounding the device, and wherein the first biometric authentication modality of the plurality of biometric authentication modalities is a facial scan modality.

13. The device of claim 9, wherein the processor is configured to assess the environmental conditions to determine a noise level associated with an environment surrounding the device, and wherein the first biometric authentication modality of the plurality of biometric authentication modalities is a voice recognition modality.

14. The device of claim 9, wherein the processor is configured to assess the environmental conditions to determine a stability level of the device, and wherein the first biometric authentication modality of the plurality of biometric authentication modalities is a palm print modality.

15. The device of claim 9, wherein the processor is configured to assess the environmental conditions to determine a temperature associated with an environment surrounding the device, and wherein the first biometric authentication modality of the plurality of biometric authentication modalities is a fingerprint scan.

16. A non-transitory computer-readable media having computer-executable instructions embodied therein that, when executed by a processor of a device, cause the device to perform operations for authenticating a user for access to an application, comprising:
  receiving a selection of an operation associated with the application;
  receiving a security threshold associated with the operation from a third party, wherein the security threshold comprises a minimum authentication score;
  assessing environmental conditions associated with the device on which a user interface is displayed, to determine a suitable subset of a plurality of biometric authentication modalities for authenticating a user and an unsuitable subset of the plurality of biometric authentication modalities not available for authenticating the user;
  displaying, via the user interface, the plurality of biometric authentication modalities, wherein the suitable subset of the plurality of biometric authentication modalities is selectable by the user but the unsuitable subset of the plurality of biometric authentication modalities are not selectable by the user;

receiving, via the user interface, a selection of a first biometric authentication modality from the suitable subset of the plurality of biometric authentication modalities;

receiving first user authentication data for the first biometric authentication modality from the suitable subset of the plurality of biometric authentication modalities;

comparing the first user authentication data for the first biometric authentication modality with previously-determined biometric data;

determining a first authentication score based on the comparison of the first user authentication data with the previously-determined biometric data;

comparing the first authentication score to the security threshold;

receiving, based on a determination that the first authentication score is less than the security threshold, second user authentication data for a second biometric authentication modality from the suitable subset of the plurality of biometric authentication modalities;

determining a second authentication score based on a comparison of the second user authentication data with the previously-determined biometric data; and authenticating the user in response to determining that the second authentication score satisfies the security threshold.

17. The non-transitory computer-readable media of claim 16, wherein assessing the environmental conditions includes determining a presence of a facial accessory of the user, and wherein the first biometric authentication modality of the plurality of biometric authentication modalities is an eye scan.

18. The non-transitory computer-readable media of claim 16, wherein assessing the environmental conditions includes determining a location of the device, and wherein the first biometric authentication modality of the plurality of biometric authentication modalities is a facial scan modality.

19. The non-transitory computer-readable media of claim 16, wherein assessing the environmental conditions includes determining an illumination level associated with an environment surrounding the device, and wherein the first biometric authentication modality of the plurality of biometric authentication modalities is a facial scan modality.

20. The non-transitory computer-readable media of claim 16, wherein assessing the environmental conditions includes determining a noise level associated with an environment surrounding the device, and wherein the first biometric authentication modality of the plurality of biometric authentication modalities is a voice recognition modality.

* * * * *